No. 609,690. Patented Aug. 23, 1898.
A. MAYERSON.
HANDLE BAR AND LUGGAGE CARRIER.
(Application filed Nov. 30, 1897.)
(No Model.) 2 Sheets—Sheet 1.
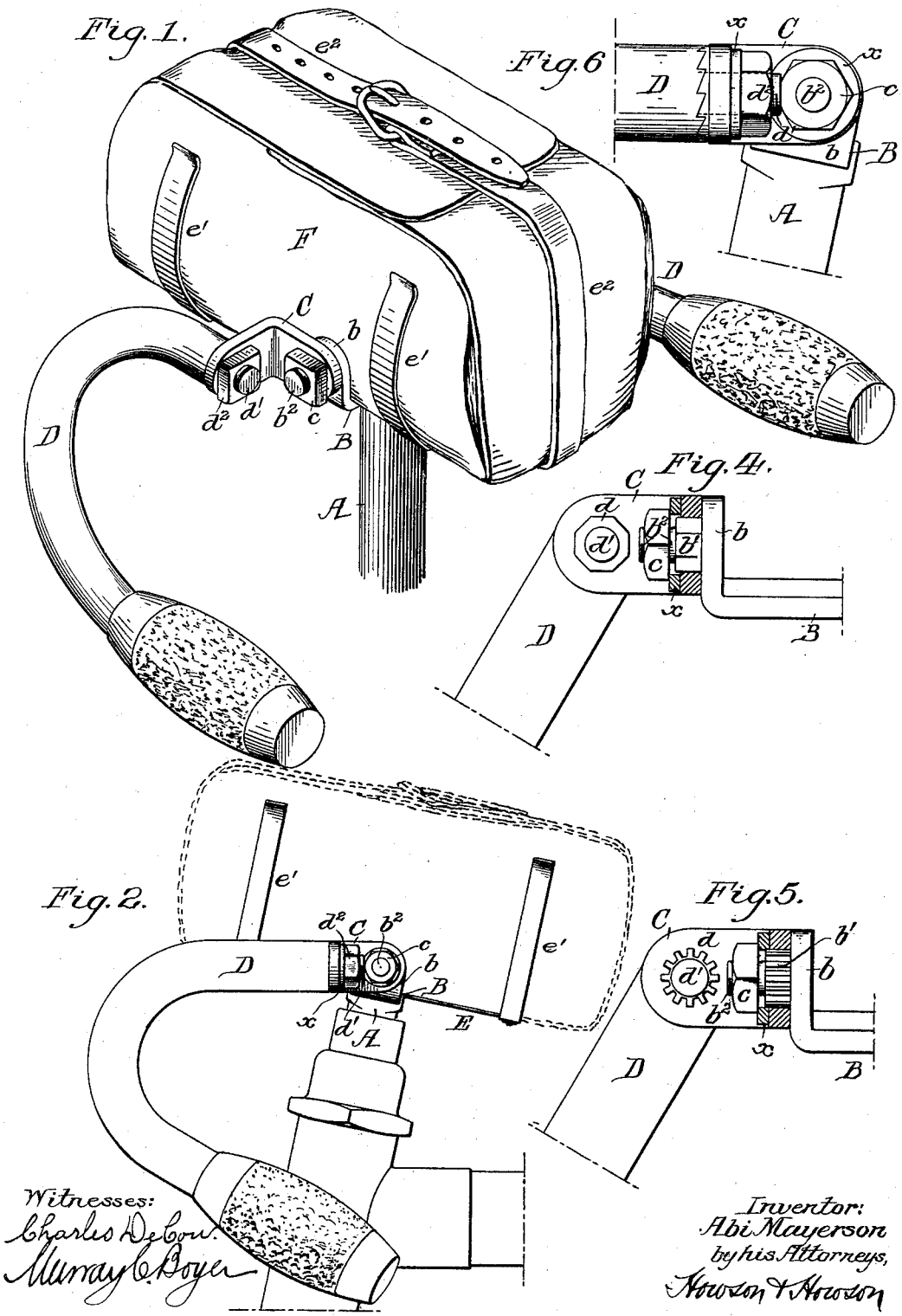

No. 609,690. Patented Aug. 23, 1898.
A. MAYERSON.
HANDLE BAR AND LUGGAGE CARRIER.
(Application filed Nov. 30, 1897.)
(No Model.) 2 Sheets—Sheet 2.
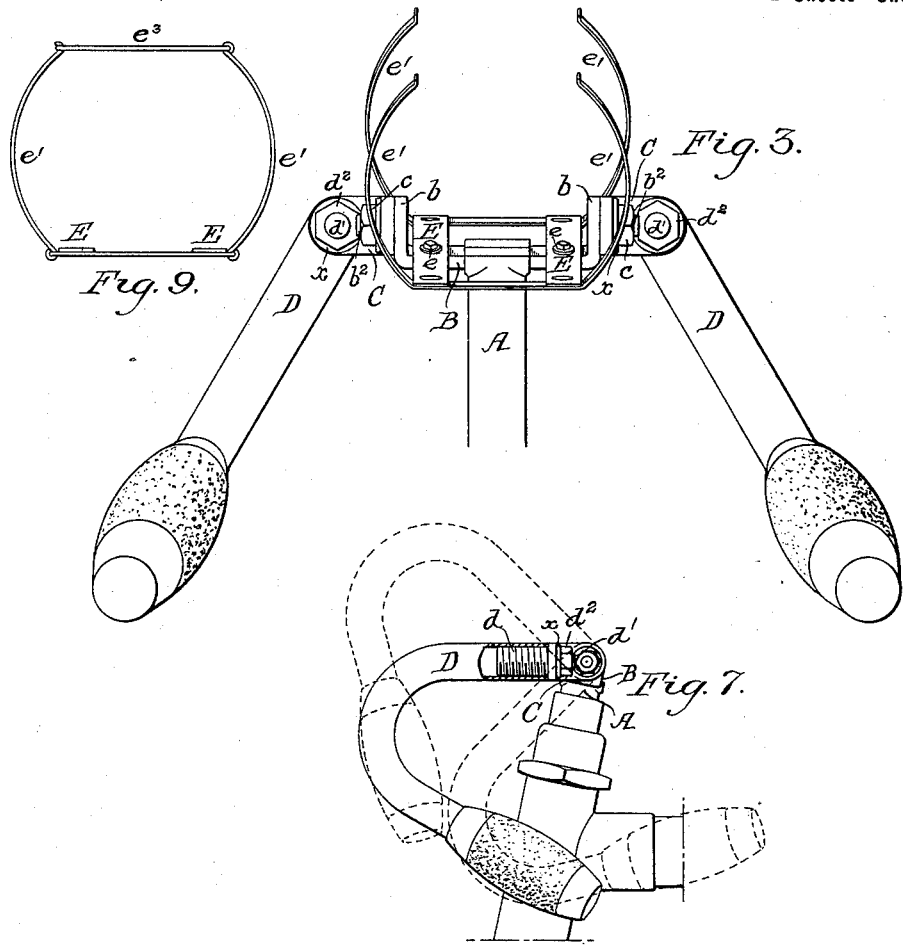
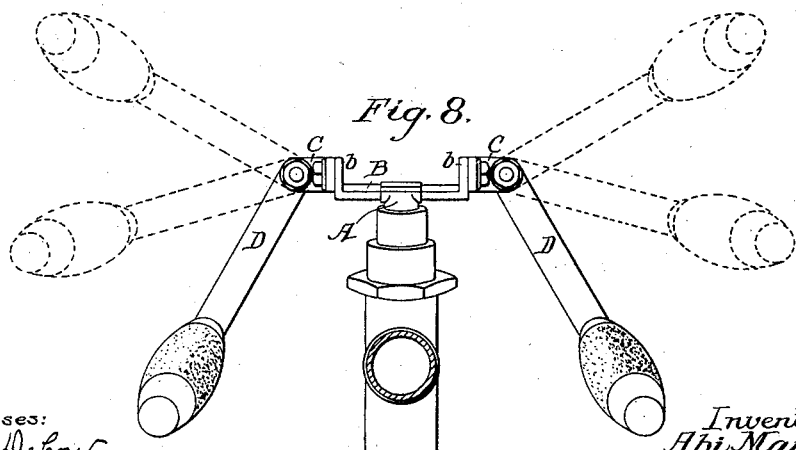
Witnesses:
Charles DeBow
Murray C. Boyer
Inventor:
Abi Mayerson
by his Attorneys,
Howson & Howson

United States Patent Office.

ABI MAYERSON, OF PHILADELPHIA, PENNSYLVANIA.

HANDLE-BAR AND LUGGAGE-CARRIER.

SPECIFICATION forming part of Letters Patent No. 609,690, dated August 23, 1898.

Application filed November 30, 1897. Serial No. 660,228. (No model.)

*To all whom it may concern:*

Be it known that I, ABI MAYERSON, a citizen of the United States, residing in Philadelphia, Pennsylvania, have invented a Combined Adjustable Handle-Bar and Luggage-Carrier for Bicycles, of which the following is a specification.

My invention consists of certain improvements in adjustable handle-bars for bicycles, including the connections for the adjustable parts and means for positively locking the handle-bars when adjusted, and of an improved form of luggage-carrier, combined with the handle-bars and which may be permanently or detachably secured thereto.

My invention is fully illustrated in the accompanying drawings, in which—

Figure 1 is a perspective view of the adjustable handle-bars with the luggage-carrier mounted thereon, showing a package secured to the same. Fig. 2 is a side view of the head of a bicycle with the adjustable handle-bars secured thereto and supporting the luggage-carrier. Fig. 3 is a rear view of the handle-bars and luggage-carrier and the cross-bar to which they are secured. Fig. 4 is a view, partly in section, showing the manner of attaching the handle-bars to the cross-bar. Figs. 5 and 6 are similar views, partly in section, showing modified forms of this connection. Figs. 7 and 8 are diagram views illustrating the adjustability of the handle-bar, and Fig. 9 is an end view of a modified form of luggage-carrier.

My invention, in so far as it relates to the adjustable handle-bars, is a follows:

To the ordinary stem A of a bicycle I attach a cross-bar B, which may be secured to the stem in any available manner, preferably, however, by splitting the end of the stem and brazing the split ends over the cross-bar, as in the present instance. The ends $b$ of the cross-bar are upturned, as shown, and to these ends studs $b'$, having threaded ends $b^2$, are adapted, or the studs may be formed integral with said ends $b$. Connected to the cross-bar B and fitting these studs $b'$ are angle-brackets C, secured thereto by the nuts $c$, adapted to the threaded ends $b^2$ of the studs $b'$. The handle-bars are also attached to these angle-brackets C. The angle-brackets have openings $c'$ in one portion to receive the studs $b'$ and similarly-shaped openings $c^2$ in the other portion to receive the studs $d$, carried by the handle-bars D.

The studs $d$ are preferably threaded into the ends of the handle-bars, as shown in Fig. 7, for a purpose to be described hereinafter. These studs $d$ are also provided with threaded ends $d'$, to which nuts $d^2$ are adapted.

The studs $b'$ and $d$ are of such a shape that they are held against turning when inserted in the openings in the brackets, said openings being shaped to receive them. In the connection shown in Fig. 4 octagonally-shaped studs are used, while in the connection shown in Fig. 5 studs having teeth engaging notches in the openings in the brackets C are used. In the connection shown in Fig. 6 the ends of the handle-bars are provided with a series of beveled teeth, fitting similarly beveled teeth formed on one face of the angle-brackets C. The threaded ends $d'$ of the studs are adapted to pass through holes in the brackets, and the handles are secured to the brackets, when adjusted, by the nuts $d^2$. With this form of connection for the handle-bars either form of connection shown in Figs. 4 and 5 may be used to hold the brackets to the cross-bar.

The angle-brackets C may be adjusted to any position on the studs $b'$, carried by the cross-bar, and the handle-bars may be adjusted to any position not interfering with said cross-bar on the angle-brackets C, the number of adjustments being determined by the number of faces on the studs of the connection shown in Fig. 4 or the number of teeth of the connecting parts shown in Figs. 5 and 6. By having the studs angular or providing the same with teeth the angle-brackets and handle-bars are held against lateral displacement when adjusted and are secured against accidental removal by the nuts $c$ and $d^2$. Washers $x$ are preferably interposed between these nuts and the faces of the angle-brackets to insure the hold of the nuts.

It will be seen that the means of connecting the handle-bars to the cross-bar, as illustrated in Figs. 4, 5, and 6, are such that the handle-bars cannot work loose under any ordinary condition, and yet they provide for almost any desired adjustment of said handle-bars.

The diagram views Figs. 7 and 8 illustrate a few of the adjusted positions of the handle-bars. They are adjustable to a forward or rear position by means of the brackets and their connection with the cross-bar, as shown in Fig. 7, the sidewise adjustment of the handle-bars being accomplished by means of the connection between the handle-bars and the angle-brackets, as shown in Fig. 8.

The handle-bars D are preferably of the shape shown in Figs. 1 and 2, although it is evident that any form or shape of bar may be employed as may suit the fancy or comfort of the rider. As I have stated before, the studs $d$ of the handle-bars D are threaded into the same, so that should the rider care to substitute another shape of bar the studs $d$ can be removed, inserted in other bars, and the new bars can be attached to the angle-brackets C in the manner already described.

The other part of my invention relates to the luggage-carrier, which I have combined with the adjustable handle-bars. The space between the upturned ends $b$ of the cross-bar B is for the luggage-carrier, and this space may be of greater or less width than shown to accommodate larger or smaller luggage-carriers, as may be desired.

In Fig. 1 the luggage-carrier is shown in its proper position with relation to the handle-bars, and in Figs. 2 and 3 side and end views, respectively, are shown. The base of the carrier consists of the metal strips E, which are riveted to the cross-bar B at $e$ and extend some distance to either side of said cross-bar at right angles thereto. At the ends of these strips spring-clips $e'$ are riveted, and between these clips the package is adapted to be confined. A strap $e^2$ is preferably secured to the bottom portion of the spring-clips and is adapted to be brought up over the package confined therein, so as to securely hold it in the same, as shown in Fig. 1. Instead of having spring-clips to retain the package against lateral movement I may hinge one or both sides of the clips $e'$ to the metal strips E and provide links $e^3$ to hold the clip members in engagement with the package. Such a construction as this is illustrated in Fig. 9.

Although the luggage-carrier is shown as a permanent attachment to the cross-bar, the strips E may be provided with lugs adapted to engage seats in the cross-bar, or vice versa, so that the luggage-carrier can be detached therefrom when not in use. With this form of carrier it may be advisable to secure to the base-pieces E of the same a cover, in which the package to be carried may be wrapped. In Fig. 1 I have shown such a cover F, which is preferably of oil-cloth, so that the articles inclosed by the same may be protected from dampness.

Having thus described my invention, I claim and desire to secure by Letters Patent—

1. The combination in a handle-bar for bicycles, of the cross-bar, handle-bars and intermediate angle-brackets having arms formed at right angles, one arm of each angle-bracket being secured to the cross-bar and the other arm of each angle-bracket being secured to a handle-bar, and means for permitting rotative adjustment of the angle-brackets on the cross-bar and of the handle-bars on the brackets, substantially as described.

2. The combination of a cross-bar, a many-sided stud thereon, a right-angled bracket having an arm with a many-sided opening adapted to the stud, the other arm of the angle-bracket also having a many-sided opening, a handle-bar having a many-sided stud adapted to said opening, and nuts adapted to the studs, substantially as described.

3. The combination of a rigid flat cross-bar having upturned ends, bolts projecting from said ends, a right-angled bracket mounted on each bolt and secured thereto by nuts, handle-bars having bolts adapted to openings in the angle-brackets and secured thereto by nuts, and a luggage-carrier mounted on the flat cross-bar between the upturned ends thereof, substantially as described.

In testimony whereof I have signed my name to this specification in the presence of two subscribing witnesses.

ABI MAYERSON.

Witnesses:
CHAS. H. BANNARD,
MURRAY C. BOYER.